United States Patent
Yuasa et al.

(10) Patent No.: US 12,375,005 B2
(45) Date of Patent: Jul. 29, 2025

(54) POWER CONVERTER AND AIR-CONDITIONING APPARATUS

(71) Applicant: Mitsubishi Electric Corporation, Tokyo (JP)

(72) Inventors: Kenta Yuasa, Tokyo (JP); Kenji Iwazaki, Tokyo (JP); Keiwa Tsukano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 223 days.

(21) Appl. No.: 18/255,177

(22) PCT Filed: Feb. 4, 2021

(86) PCT No.: PCT/JP2021/004076
§ 371 (c)(1),
(2) Date: May 31, 2023

(87) PCT Pub. No.: WO2022/168222
PCT Pub. Date: Aug. 11, 2022

(65) Prior Publication Data
US 2024/0007011 A1    Jan. 4, 2024

(51) Int. Cl.
*H02P 1/00* (2006.01)
*F24F 11/88* (2018.01)
*H02M 1/08* (2006.01)
*H02M 5/458* (2006.01)
*H02P 27/08* (2006.01)

(52) U.S. Cl.
CPC ........... *H02M 5/4585* (2013.01); *F24F 11/88* (2018.01); *H02M 1/08* (2013.01); *H02P 27/08* (2013.01)

(58) Field of Classification Search
CPC ............................ H02P 27/08; H02M 5/4585
See application file for complete search history.

(56) References Cited

U.S. PATENT DOCUMENTS
2017/0277108 A1* 9/2017 Masaki .............. G03G 15/0283

FOREIGN PATENT DOCUMENTS
JP          2011067029 A  *  3/2011

OTHER PUBLICATIONS

International Search Report of the International Searching Authority mailed Apr. 6, 2021 in the corresponding International Application No. PCT/JP2021/004076 (and English translation).

* cited by examiner

*Primary Examiner* — Karen Masih
(74) *Attorney, Agent, or Firm* — Posz Law Group, PLC

(57) ABSTRACT

A power converter includes a power converting module and a gate drive circuit that includes first and second drive circuits and a power supply module including a limiting resistor, a bootstrap diode, and a bootstrap capacitor, and configured to generate a voltage to be supplied to the second drive circuit. The bootstrap capacitor is charged when a switching element connected to a reference potential side performs switching. A charging period of the bootstrap capacitor includes at least first and second periods. In the first period, the switching element is driven by a pulse signal having a first pulse width. In the second period, the switching element is driven by a pulse signal having a second pulse width greater than the first one. The first pulse width in the first period is determined based on an allowable magnitude of a voltage drop of the control power supply in the first period.

12 Claims, 6 Drawing Sheets

(a)

(b)

POWER CONVERTER AND AIR-CONDITIONING APPARATUS

CROSS-REFERENCE TO RELATED APPLICATION

This application is a U.S. national stage application of PCT/JP2021/004076 filed on Feb. 4, 2021, the contents of which are incorporated herein by reference.

TECHNICAL FIELD

The present disclosure relates to a power converter that converts power from a power supply into power having an arbitrary frequency and an arbitrary voltage and supplies the power to a load, such as a motor, and relates to an air-conditioning apparatus having the power converter.

BACKGROUND ART

In recent years, to meet the demand for energy saving, a larger number of air-conditioning apparatuses have adopted an inverter system. An inverter is a device capable of arbitrarily adjusting a voltage and a frequency of power and outputting the power. In the case where an inverter is mounted in an air-conditioning apparatus, the inverter adjusts the output of a motor that drives a compressor depending on a load of an air-conditioning target space, thereby preventing the air-conditioning target space from being excessively cooled or heated. Therefore, the energy consumption can be reduced.

Furthermore, the voltage and frequency of power to be supplied to a load, such as a motor, is adjusted by on-off operation of a switching device mounted on an inverter substrate. As a control method for the on-off operation, a pulse width modulation (PWM) method is commonly used.

In most cases, as an inverter to be provided in an air-conditioning apparatus, a power module is used. In the power module, a transistor serving as a switching device and a gate drive circuit for the transistor are integrated.

In the above case, in order to drive the power module, it is necessary to provide a power supply that supplies power to the gate drive circuit. In the inverter, a transistor of an upper arm (high side) on a high potential side and a transistor of a lower arm (low side) on a lower potential side are connected in series. Hereinafter, a circuit that drives the transistor of the lower arm will be referred to as a low-side circuit, and a circuit that drives the transistor of the upper arm will be referred to as a high-side circuit. In addition, the connection point between the transistor of the upper arm and the transistor of the lower arm will be referred to as a middle point.

In the low-side circuit, because a reference potential is ground potential, a common power supply can be used as a control power supply. By contrast, in the high-side circuit, because the reference potential is the potential at the middle point, a common power supply whose reference potential is ground potential cannot be used as a control power supply.

In view of the above, a floating power supply method or a bootstrap method is used to supply power to the high-side circuit. In the bootstrap method, a bootstrap capacitor is connected to a power supply input of the high-side circuit. Then, the transistor of the lower arm is switched to make a current path that extends toward a gate drive circuit for the upper arm and to charge the bootstrap capacitor. After the bootstrap capacitor is charged, electric charge accumulated in the bootstrap capacitor is used as a power supply to drive the transistor of the upper arm. Charging of the bootstrap capacitor in the above manner will be referred to as a bootstrap operation, and a charging period thereof in which the bootstrap capacitor is charged will be referred to as a bootstrap period.

The bootstrap method does not use a high cost component, such as a transformer or a dedicated power supply, for driving of the high-side circuit. In this regard, the bootstrap method has an advantage, but has the following problem: in charging of the bootstrap capacitor, a large current instantaneously flows in a power supply circuit of the low-side circuit, as a result of which a voltage drop may occur in the control power supply of the low-side circuit due to an internal impedance in the power supply circuit of the low-side circuit.

For example, Patent Literature 1 discloses that in general, a large current flows in a bootstrap circuit during initial charging of a bootstrap capacitor, and therefore, a large allowable current enough to withstand an initial charging current is required. As a problem of an existing technique, Patent Literature 1 discloses that the size of the bootstrap circuit is increased to ensure the allowable current, and that power loss and heat generation are caused by a limiting resistor of the bootstrap circuit.

Furthermore, Patent Literature 1 proposes, as a method for solving the above problem of the existing technique, a method in which a first period and a second period are provided as the charging period of the bootstrap capacitor. In the first period, the low-side circuit intermittently performs charging to reduce current to be used. In the second period, the low-side circuit performs continuous charging to complete charging.

CITATION LIST

Patent Literature

Patent Literature 1: Japanese Unexamined Patent Application Publication No. 2011-67029

SUMMARY OF INVENTION

Technical Problem

When the method described in Patent Literature 1 is adopted, the problems in which the bootstrap circuit is made larger and power loss and heat generation occur due to a limiting resistor of the bootstrap circuit can be solved.

However, Patent Literature 1 does not take into consideration a voltage drop of a control power supply. Consequently, depending on the pulse width in intermittent energization, duty, a time length of the first period, and an internal impedance of the control power supply, the voltage drop of the control power supply may become large and a great stress may thus be applied to the power supply circuit of the low-side circuit. Furthermore, in Patent Literature 1, if a protection circuit that detects a voltage drop is provided in the low-side circuit as a measure for the voltage drop of the control power supply, the protection circuit may act to cause a power converter to be abnormally stopped.

The present disclosure is applied to solve the above problems, and relates to a power converter capable of charging a bootstrap capacitor while reducing the probability that a voltage drop of a control power supply will occur during the charging of the bootstrap capacitor, and an air-conditioning apparatus provided with the power converter.

Solution to Problem

A power converter according to an embodiment of the present disclosure includes: a power converting module in which at least two switching elements are connected in series to form a series body, one end of the series body is connected to a power supply potential side and the other end of the series body is connected to a reference potential side, and a middle point of the series body is connected to an output terminal; and a gate drive circuit configured to output a pulse signal based on a control signal from a controller to drive the switching elements, the controller being provided outside the power converter. The gate drive circuit includes a first drive circuit configured to drive one of the switching elements that is connected to the reference potential side, when being supplied with power from the control power supply, a second drive circuit configured to drive one of the switching elements that is connected to the power supply potential side, and a power supply module including a limiting resistor, a bootstrap diode, and a bootstrap capacitor, which are connected in series between the control power supply and the output terminal, the power supply module being configured to generate a power supply voltage to be supplied to the second drive circuit. The bootstrap capacitor is charged when the switching element connected to the reference potential side performs switching. A charging period of the bootstrap capacitor includes at least a first period and a second period. In the first period, the switching element connected to the reference potential side is driven by a pulse signal having a first pulse width. In the second period, the switching element connected to the reference potential side is driven by a pulse signal having a second pulse width which is greater than the first pulse width. The first pulse width in the first period is determined based on an allowable magnitude of a voltage drop of the control power supply in the first period.

An air-conditioning apparatus according to another embodiment of the present disclosure includes a refrigeration cycle apparatus and a fan. The refrigeration cycle apparatus includes the power convert, a compressor configured to be driven by an electric motor, which is a load of the power converter, a condenser configured to condense refrigerant discharged from the compressor, an expansion valve configured to decompress the condensed refrigerant, and an evaporator configured to evaporate the decompressed refrigerant. The fan is configured to send air to at least one of the condenser and the evaporator of the refrigeration cycle apparatus.

Advantageous Effects of Invention

According to the power converter and the air-conditioning apparatus according to embodiments of the present disclosure, it is possible to charge the bootstrap capacitor while reducing the probability that a voltage drop of the control power supply will occur during the charging of the bootstrap capacitor.

DESCRIPTION OF EMBODIMENTS

Power converters and an air-conditioning apparatus according to embodiments of the present disclosure will be described with reference to the drawings. In the present disclosure, the following descriptions concerning the embodiments are not limiting. Various modifications are conceivable without departing from the gist of the present disclosure. Furthermore, the present disclosure encompass all possible combinations of configurations described below regarding the embodiments and modifications thereof. Moreover, in each of the figures, components that are the same as or equivalent to those in a previous figure or previous figures are denoted by the same reference signs, and the same is true of the entire text of the specification. In addition, regarding the embodiments and the modifications, electrical connection will be simply referred to as "connection". It should be noted that in each of the figures, a relative relationship in dimension between components, shapes of the components, etc., may differ from actual ones.

Embodiment 1

Figure 1:
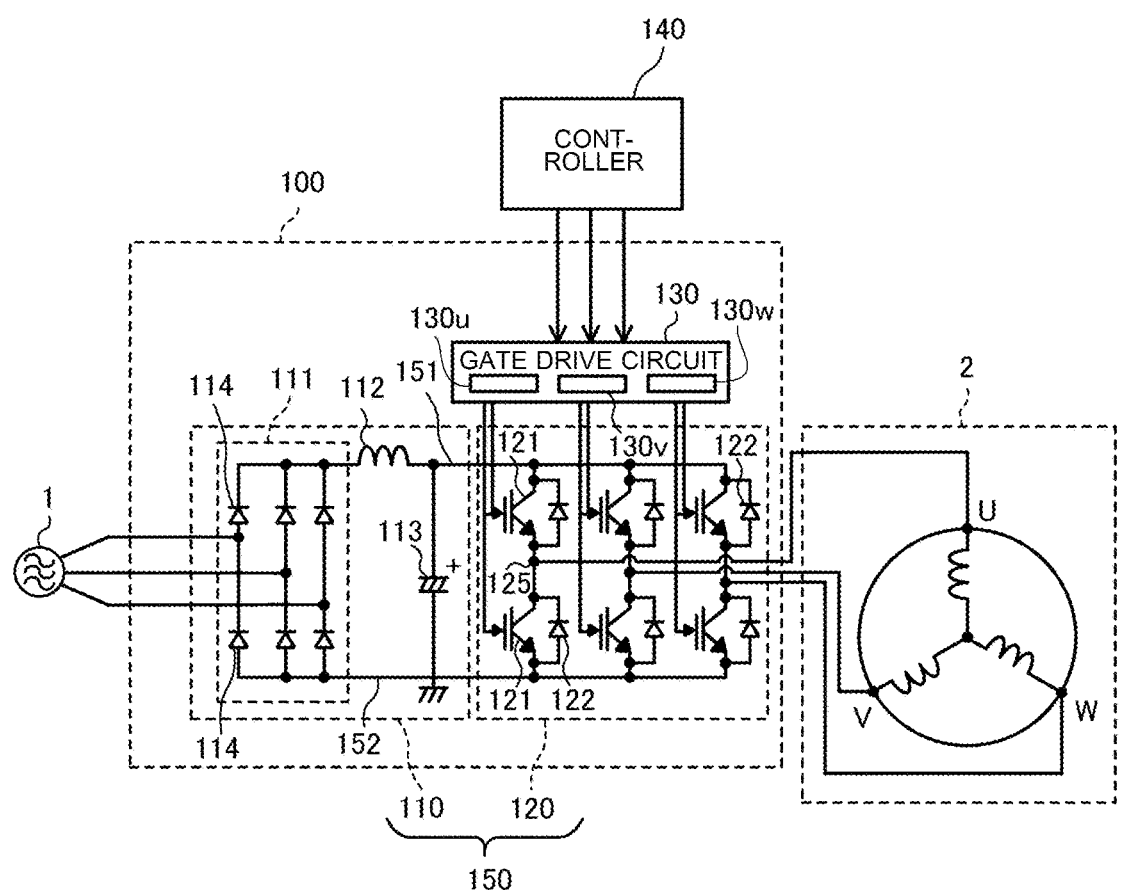
FIG. 1 is a configuration diagram illustrating an example of the configuration of a power converter 100 according to Embodiment 1.
Figure 2:
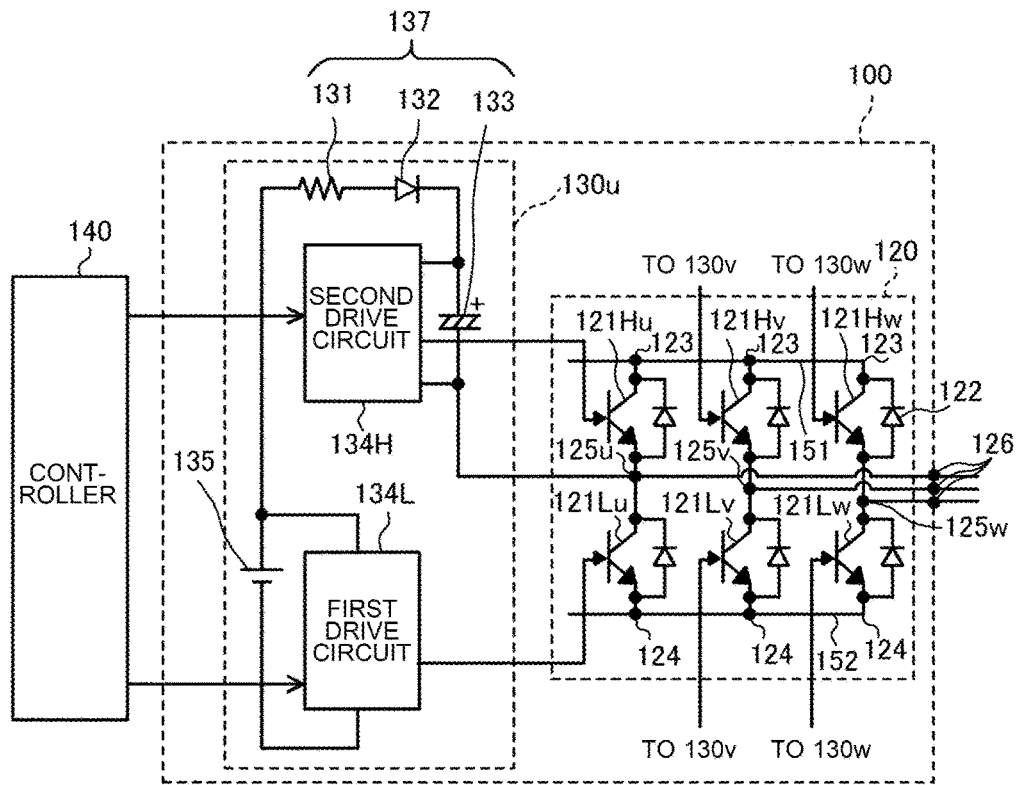
FIG. 2 is an enlarged view illustrating part of the configuration of a gate drive circuit 130 and the configuration of an inverter 120 as illustrated in FIG. 1.

FIG. 1 is a configuration diagram illustrating an example of the configuration of a power converter 100 according to Embodiment 1. FIG. 2 is an enlarged view illustrating part of the configuration of a gate drive circuit 130 and the configuration of an inverter 120 as illustrated in FIG. 1.

As illustrated in FIG. 1, the power converter 100 according to Embodiment 1 includes the gate drive circuit 130 and a power converting module 150 that includes a converter 110 and the inverter 120. The gate drive circuit 130 is controlled by a controller 140 provided outside. To the power converter 100, an alternating-current (AC) power supply 1 and an electric motor 2 are connected. The AC power supply 1 is a power supply, and the electric motor 2 is a load. The AC power supply 1 is, for example, a three-phase commercial power supply having a U phase, a V phase, and a W phase. The electric motor 2 is, for example, a three-phase permanent magnet type synchronous motor having a U phase, a V phase, and a W phase. It should be noted that it is not indispensable that the converter 110 is provided in the power converting module 150. That is, it suffices that the converter 110 is provided in the power converting module 150 as occasion arises. The following description is made by way of example with respect to the case where the converter 110 is provided.

The inverter 120 includes semiconductor switches 121. Each of the semiconductor switches 121 is a switching element, such as, an insulated gate bipolar transistor (IGBT), a metal-oxide-semiconductor field effect transistor (MOSFET), a high electron mobility transistor (HEMT), or a similar element. The inverter 120 controls the on/off state of the semiconductor switch 121, thereby controlling a path for a current that flows into the electric motor 2 and driving the electric motor 2. In the inverter 120, series bodies in each of which at least two semiconductor switches 121 are connected in series are formed for respective phases. In addition, one end of each of the series bodies is connected to a power supply potential side (high potential side), and the other end of the series body is connected to a reference potential side (low potential side). Furthermore, middle points 125 of the series bodies are connected to respective output terminals 126 (see FIG. 2) of the power converter 100.

In an example illustrated in FIG. 1, the inverter 120 is connected to a positive-side bus 151 and a negative-side bus 152, which are output ends of the converter 110. The inverter 120 converts a direct-current (DC) voltage which is rectified by a rectifier circuit 111 of the converter 110, into an AC voltage, and output the AC voltage to the electric motor 2. By the operation of the inverter 120, the voltage value and the frequency of the AC voltage to be supplied to the electric motor 2 can be varied. It should be noted that although the description is made with respect to the case where the electric motor 2 is a load of the power converter 100, another device may be used as the load of the power converter 100. The inverter 120 is, for example, a full-bridge circuit including six semiconductor switches 121. A detailed description will be made with reference to FIG. 2. Three semiconductor switches 121Hu, 121Hv, and 121Hw are provided for the U phase, the V phase, and the W phase of the electric motor 2, respectively, as semiconductor switches 121 of an upper arm that are connected to the positive-side bus 151. In addition, three semiconductor switches 121Lu, 121Lv, and 121Lw are provided for the U phase, the V phase, and the W phase of the electric motor 2, respectively, as semiconductor switches 121 of a lower arm that are connected to the negative-side bus 152. The semiconductor switches 121Hu, 121Hv, and 121Hw of the upper arm are connected in series to the semiconductor switches 121Lu, 121Lv, and 121Lw of the lower arm, respectively, for the respective phases, thereby forming respective series bodies. Then, by connecting these three series bodies in parallel, a full-bridge circuit is formed. It should be noted that each of the semiconductor switches 121H of the upper arm will be referred to as a high-side semiconductor switch 121H, and each of the semiconductor switches 121L of the lower arm will be referred to as a low-side semiconductor switch 121L. Also, it should be noted that although the description is made by way of example with respect to the case where the number of the phases of the inverter 120 is three, the number of the phases may be two or less, or four or more.

As illustrated in FIGS. 1 and 2, freewheeling diodes 122 are connected in reverse parallel with the respective semiconductor switches 121. The semiconductor switches 121 perform on-off operation independently of each other in response to drive switch signals output by the gate drive circuit 130. By the on-off operation, a DC voltage is converted into an AC voltage.

As illustrated in FIG. 1, the converter 110 includes the rectifier circuit 111, a DC reactor 112, and a smoothing capacitor 113. The rectifier circuit 111 rectifies an AC voltage of the AC power supply 1 and converts the AC voltage into a DC voltage. To the output side of the rectifier circuit 111, the smoothing capacitor 113 is connected in parallel via the DC reactor 112. The smoothing capacitor 113 smooths the DC voltage input from the rectifier circuit 111 via the DC reactor 112.

The rectifier circuit 111 is, for example, a full-bridge circuit including six rectifier diodes 114. More specifically, two rectifier diodes 114 are connected in series to form a series body. Three series bodies are each formed in the above manner, and are then connected in parallel to form a full-bridge circuit. It should be noted that, instead of the rectifier diodes 114, switching elements, such as transistors, may be used to form the rectifier circuit 111. The output terminals of the rectifier circuit 111 are connected to the positive-side bus 151 and the negative-side bus 152.

Figure 8:
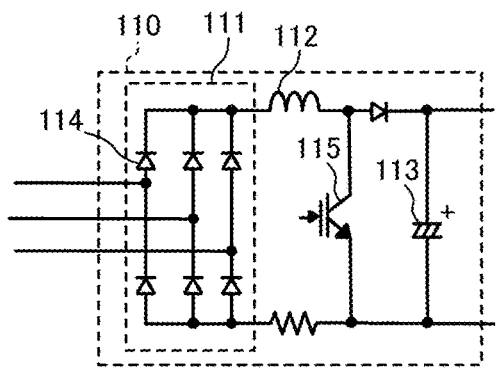
FIG. 8 illustrates the case where a converter 110 provided in the power converter 100 according to Embodiment 1 is an active converter.
Figure 8:
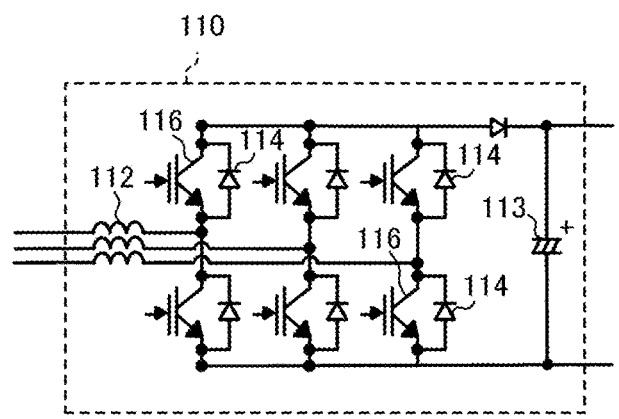

In general, as converters, a passive converter and an active converter are present. In the passive converter, AC-DC conversion is performed by a passive element, such as the rectifier diode 114. The active converter includes switching elements each of which is, for example, an IGBT, MOSFET, HEMT, or a similar device, as well as the inverter 120. The converter 110 as illustrated in FIG. 1 is a passive converter. However, the converter 110 according to Embodiment 1 is not limited to the passive converter, and may be an active converter. FIG. 8 illustrates the case where the converter 110 provided in the power converter 100 according to Embodiment 1 is an active converter. In an example illustrated in Fig, (a), a single switching element 115 is connected parallel to the rectifier circuit 111. In an example illustrated in FIG. 8, (b), switching elements 116 are connected parallel to respective rectifier diodes 114 in the rectifier circuit 111. In the active converter, as illustrated in FIG. 8, (b), a passive element, such as the rectifier diode 114, and the switching element 116 may also be used in combination. In both the cases where the converter is the passive converter and where the converter is the active converter, elements of the rectifier circuit 111 are connected in combination in a bridge form, as illustrated in FIG. 1, FIG. 8, (a) and FIG. 8, (b). It should be noted that the configuration of the converter 110 of Embodiment 1 is not limited to the configurations as illustrated in FIG. 1, FIG. 8, (a) or FIG. 8, (b). In addition, the number of phases of the converter 110, the combination and the connection sequence of the elements to be used, etc., are not limited to those of the configurations of FIG. 1, FIG. 8, (a), or FIG. 8, (b).

The controller 140 is provided outside the power converter 100. An operation command, such as a speed command or a torque command, is input to the controller 140 from the outside. The controller 140 produces a control signal based on the operation command, and outputs the control signal to the gate drive circuit 130. It should be noted that the controller 140 may be provided in the power converter 100.

The gate drive circuit 130 outputs pulse signals 10 (see FIG. 3) as drive switch signals to the semiconductor switches 121 of the inverter 120. As a result, the semiconductor switches 121 perform on-off operation independently of each other. In addition, in the case where the converter 110 is an active converter using an active element, the gate drive circuit 130 may drive the converter 110. The gate drive circuit 130 drives one or both of the converter 110 and the inverter 120 in response to a control signal from the controller 140.

It should be noted that the converter 110, the inverter 120, and the gate drive circuit 130 may be provided in the same module, or may be provided separately in two or more modules. In the latter case, for example, a combination of the converter 110 and the gate drive circuit 130 is provided in the same module, and the inverter 120 is provided in the other module. Alternatively, a combination of the inverter 120 and the gate drive circuit 130 is provided in the same module, and the converter 110 is provided in the other module. In such a manner, the above elements can be combined in a plurality of patterns; however, the way of combining the elements in Embodiment 1 is not limited to a single way.

Furthermore, as illustrated in FIG. 1, in the gate drive circuit 130, gate drive circuits 130u, 130v, and 130w are provided in association with the U phase, V phase, and W phase of the electric motor 2, respectively. In order to simplify the illustration, FIG. 2 illustrates only the gate drive circuit 130u for the U phase in the gate drive circuit 130 as illustrated in FIG. 1. Because the gate drive circuits 130u, 130v, and 130w have the same configuration, in the following, only the gate drive circuit 130u is described, and descriptions concerning the gate drive circuits 130v and 130w are omitted.

As illustrated in FIG. 2, the gate drive circuit 130u includes a limiting resistor 131, a bootstrap diode 132, a bootstrap capacitor 133, a second drive circuit 134H, a first drive circuit 134L, and a control power supply 135. The limiting resistor 131, the bootstrap diode 132, and the bootstrap capacitor 133 are connected in series between the control power supply 135 and the output terminal 126 to form a power supply module 137. The power supply module 137 generates a power supply voltage to be applied to the second drive circuit 134H. It should be noted that although FIG. 2 illustrates only one phase (U phase) to simplify the illustration, in the case where a plurality of phases are applied, power supply modules 137 may be provided for the respective phases, or a single power supply module 137 may be provided in common for the phases. In addition, another element, such as a filter circuit or a protection circuit, may be provided in the gate drive circuit 130u.

The control power supply 135 is connected to both terminals of the first drive circuit 134L. The control power supply 135 supplies power to the first drive circuit 134L.

One of terminals of the limiting resistor 131 is connected to the control power supply 135 and the other is connected to the anode of the bootstrap diode 132.

The cathode of the bootstrap diode 132 is connected to a positive electrode of the bootstrap capacitor 133.

The negative electrode of the bootstrap capacitor 133 is connected to a middle point 125u, which is a connection point between the semiconductor switch 121Hu and the semiconductor switch 121Lu. The bootstrap capacitor 133 is connected to both terminals of the second drive circuit 134H. The bootstrap capacitor 133 supplies power to the second drive circuit 134H.

The low-side semiconductor switch 121L of the inverter 120 is driven by the first drive circuit 134L which has received a control signal from the controller 140. When the low-side semiconductor switch 121L is turned on, a current path as described below is produced and current flows in the low-side semiconductor switch 121. That is, in the current path, current flows into the low-side semiconductor switch 121L through the control power supply 135, the limiting resistor 131, the bootstrap diode 132, and the bootstrap capacitor 133. As a result, the bootstrap capacitor 133 is charged. In this state, when the low-side semiconductor switch 121L is turned off, the bootstrap capacitor 133 serves as a floating power supply and the high-side semiconductor switch 121H can thus be driven. As described above, the bootstrap capacitor 133 is charged by switching of at least one of the low-side semiconductor switches 121L.

Figure 3:
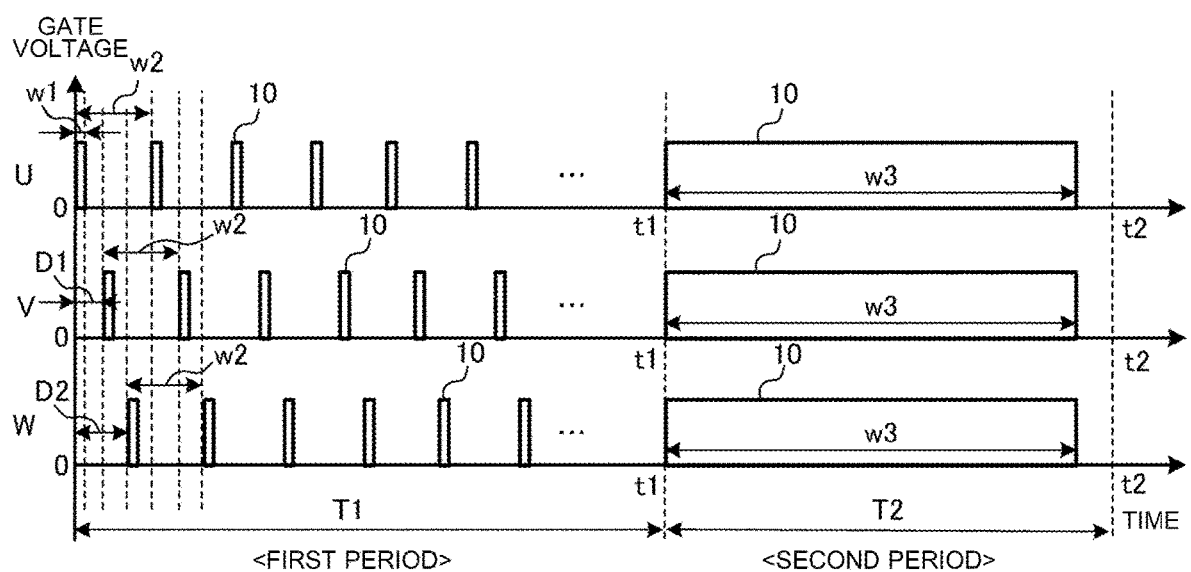
FIG. 3 is a schematic diagram illustrating gate waveforms for charging a bootstrap capacitor 133 in the power converter 100 according to Embodiment 1.

FIG. 3 is a schematic diagram illustrating gate waveforms for charging the bootstrap capacitor 133 in the power converter 100 according to Embodiment 1. In FIG. 3, the horizontal axis indicates time and the vertical axis indicates gate waveforms for the U phase, the V phase, and the W phase in the order from top to bottom.

At the time of charging the bootstrap capacitor 133, the controller 140 outputs a command to intermittently energize the low-side semiconductor switch 121L, to the first drive circuit 134L of each of the gate drive circuits 130u, 130v, and 130w. In the gate waveforms as indicated in FIG. 3, when a pulse signal 10 is in the on-state, the semiconductor switch 121L is in the on-state (energized state), and when the pulse signal 10 is in the off-state, the semiconductor switch 121L is in the off-state (shut-off state).

As illustrated in FIG. 3, the charging period of the bootstrap capacitor 133 includes at least two periods. The following description is made by way of example with respect to the case where in Embodiment 1, the charging period of the bootstrap capacitor 133 includes two periods. Of the periods, a period from time 0 to time t1 will be referred to as a first period, and a period from time t1 to time t2 will be referred to as a second period. The switching pattern of the low-side semiconductor switch 121L varies between these periods. In the first period, the low-side semiconductor switch 121L is driven by a pulse signal having a first pulse width w1. In the second period, the low-side semiconductor switch 121L is driven by a pulse signal 10 having a second pulse width w3, which is greater than the first pulse width w1. In addition, a time length T1 of the first period is determined based on a resistance value R of the limiting resistor 131 and a capacitance C of the bootstrap capacitor 133. The first and second periods will be described in detail below.

First Period

In the first period, each of the low-side semiconductor switches 121Lu, 121Lv, and 121Lw is intermittently energized (hereinafter referred to as pulse charge). More specifically, for each phase, in the first period, a pulse signal 10 having a pulse width w1 (first pulse width) is output at regular pulse intervals w2 as illustrated in FIG. 3. The "pulse interval" is sometimes called a carrier period or switching carrier. As described above, the pulse interval w2 is a pulse interval for one phase or a carrier period during the bootstrap period.

A duty Duty for each phase in the first period is given as the following formula (1). The duty Duty is the ratio of the pulse width w1 to the pulse interval w2, that is, the ratio of energizing time to the pulse interval w2.

$$\text{Duty} = w1/w2 \tag{1}$$

The pulse width w1 is greater than a minimum pulse limiting value which is determined based on the function of a processor included in the controller 140 or based on restrictions on a protection circuit which protects the control power supply 135, and is smaller than the pulse interval w2. That is, the pulse width w1 is determined based on the allowable magnitude of a voltage drop (which is an allowable voltage variation width) in the control power supply 135 in the first period. As a result, it is possible to prevent occurrence of a voltage drop having a magnitude at which the protection circuit operates.

In addition, in the case where the inverter 120 is a three-phase inverter, the pulse signal 10 for each phase is output with a phase shift of 120 degrees, as illustrated in FIG. 3. To be more specific, a V phase pulse signal 10 is output with a delay of a phase difference D1 (=120 degrees) from a U phase pulse signal 10. Furthermore, a W phase pulse signal 10 is output with a delay of the phase difference D1 (=120 degrees) from the V phase pulse signal 10. Therefore, the W pulse signal 10 is output with a delay of a phase difference D2 (=240 degrees), which is twice the phase difference D1, from the U phase pulse signal 10. In such a manner, the U phase pulse signal, the V phase pulse signal, and the W-phase pulse signal are output in this order after being each shifted by the phase difference D1 in the above manner. However, the number of phases of the inverter 120 is not limited. Thus, where the number of phases of the inverter 120 is p, the pulse signal 10 for each phase is output with a phase shift which is obtained by dividing 360 degrees by the number p of phases (360 degrees÷p).

The time length T1 of the first period in which pulse charge is performed is defined by a time constant τ, which is calculated from the capacitance C of the bootstrap capacitor 133 and the resistance value R of the limiting resistor 131 which is provided as illustrated in FIG. 2.

For example, the time constant τ is given by the following formula (2), where C is the capacitance, R is the resistance value R, and Duty is the duty in the above formula (1).

$$\tau = C \times R / \text{Duty} \quad (2)$$

The time length T1 of the first period is set in such a manner as to satisfy the following formula (3).

$$T1 > \tau \quad (3)$$

In addition, when the time length T1 of the first period is set, the time constant τ of the above formula (3) may be multiplied by an arbitrary coefficient A based on the allowable magnitude of the voltage drop of the control power supply 135 in the second period. In this case, the time length T1 is expressed by the following formula (4), using the above formulas (2) and (3). It should be noted that the coefficient A is an arbitrary value of 1 or greater.

$$T1 > A \times C \times R / \text{Duty} \quad (4)$$

When A=1, the voltage of the bootstrap capacitor 133 reaches approximately 63% of an input voltage from the control power supply 135 at the end of the first period having the time length T1. When A=2, because the time length T1 can be extended, as compared with the case where A=1, the voltage of the bootstrap capacitor 133 reaches approximately 86% of the input voltage from the control power supply 135 at the end of the first period. In addition, when A=3, the voltage of the bootstrap capacitor 133 reaches approximately 95% of the input voltage from the control power supply 135 at the end of the first period. When the first period ends, the period shifts from the first period to the second period and the charging of the bootstrap capacitor 133 is completed. The smaller the difference between the voltage of the bootstrap capacitor 133 and the input voltage, the smaller the charging current. Therefore, in order to reduce a voltage drop in the second period, the coefficient A is increased to increase the voltage of the bootstrap capacitor 133. Thus, the difference between the voltage of the bootstrap capacitor 133 and the input voltage can be reduced in the second period. It is therefore possible to reduce a voltage drop in the second period. In such a manner, the coefficient A may be determined based on the allowable magnitude of the voltage drop (allowable voltage variation width) in the control power supply 135 in the second period. In such a case, it is preferable that the coefficient A be determined as an arbitrary value of 2 or greater. As described above, it suffices that the coefficient A is determined as an arbitrary value, depending on a purpose. In addition, although the above description is made with respect to the case where the coefficient A is an integer, such as 1, 2, 3, ..., the coefficient A is not limited to the integer and may be a real number of 1 or larger.

Second Period

Referring to FIG. 3, the period from time t1 to time t2 is the second period. The time t2 is time at which the bootstrap operation ends. In such a manner, in the bootstrap operation, when the first period ends, the period shifts from the first period to the second period. In the second period, switching between the U, V, and W phases is performed at the same timing, and this switching is performed by the pulse signal 10 having the pulse width w3 (second pulse width) to charge the bootstrap capacitor 133. The pulse width w3 is greater than the pulse interval w2 of the first period and is less than or equal to a time length T2 of the second period. Thus, the pulse width w3 falls within a range expressed by the following formula (4).

$$w2 < w3 \leq T2 \quad (5)$$

As can be seen from the above formula (5), the pulse width w3 may be made to coincide with the time length T2 of the second period. In such a case, w3=T2. When w3=T2, the pulse signal 10 is continuously in the on-state in the second period. At the time t2 at which the second period ends, the charging of the bootstrap capacitor 133 is completed.

As described above, in Embodiment 1, the bootstrap capacitor 133 is charged when switching of at least one of the low-side semiconductor switches 121 connected to the reference potential side is performed. The charging period of the bootstrap capacitor 133 includes at least the first period and the second period. In the first period, the low-side semiconductor switch 121 is driven by a pulse signal 10 having the first pulse width w1. In the second period, the low-side semiconductor switch 121 is driven by a pulse signal 10 having the second pulse width w3, which is greater than the first pulse width w1. In order to prevent occurrence of a voltage drop having a magnitude at which the protection circuit operates in the first period, the first pulse width w1 is determined based on the allowable magnitude of voltage drop in the first period.

As described above, in Embodiment 1, the first pulse width w1 is determined in such a manner as to enable a voltage drop of the control power supply 135 to be reduced in the first period. Furthermore, in Embodiment 1, the time length T1 of the first period is set based on the resistance value R of the limiting resistor 131 and the capacitance C of the bootstrap capacitor 133. It is therefore possible to charge the bootstrap capacitor 133 while reducing a voltage drop of the control power supply 135 during the charging. In such a manner, according to Embodiment 1, by reducing lowering of the voltage of the control power supply 135, which is a source that applies a voltage to the bootstrap capacitor 133, it is possible to reduce a stress that acts on the power supply module 137 due to a sudden voltage change. In addition, also, in the case where a protection circuit that detects a voltage drop of the control power supply 135 is provided, lowering of the voltage of the control power supply 135 is reduced, and an abnormal stop caused by the protection circuit can thus be prevented.

Furthermore, the voltage of the control power supply 135 is lowered by charging current during an initial charging period in which the voltage of the bootstrap capacitor 133 is not raised, that is, during the first period. Therefore, in Embodiment 1, the pulse width w1, the pulse interval w2, and the time length T1 of the first period are set to respective values at which, especially, a voltage drop of the control power supply 135 can be reduced in the first period. In addition, after the voltage of the bootstrap capacitor 133 is raised to some extent by pulse charge in the first period, the voltage of the control power supply 135 is not easily lowered. Thus, in Embodiment 1, the low-side semiconductor switch 121 is driven by a pulse signal 10 having the second pulse width w3, which is greater than the first pulse width w1, in the second period. As a result, the charging period can be shorten.

Furthermore, in Embodiment 1, the first drive circuit 134L that drives the low-side semiconductor switch 121L, the second drive circuit 134H that drives the high-side semiconductor switch 121H, and the power supply module 137 are provided. The power supply module 137 includes the limiting resistor 131, the bootstrap diode 132, and the bootstrap capacitor 133, and produces a power supply voltage to be applied to the second drive circuit 134H. In addition, for each phase, switching is performed with a phase difference that is obtained by dividing 360 degrees by the number p of phases. In Patent Literature 1, switching for the phases is performed at the same timing with no phase difference. Therefore, a voltage drop of the control power supply cannot be easily reduced, and a voltage drop of the control voltage easily occurs. By contrast, in Embodiment 1, for each phase, switching is performed with a phase difference in the first period, and it is therefore possible to efficiently reduce a voltage drop of the control voltage.

Embodiment 2

Figure 4:
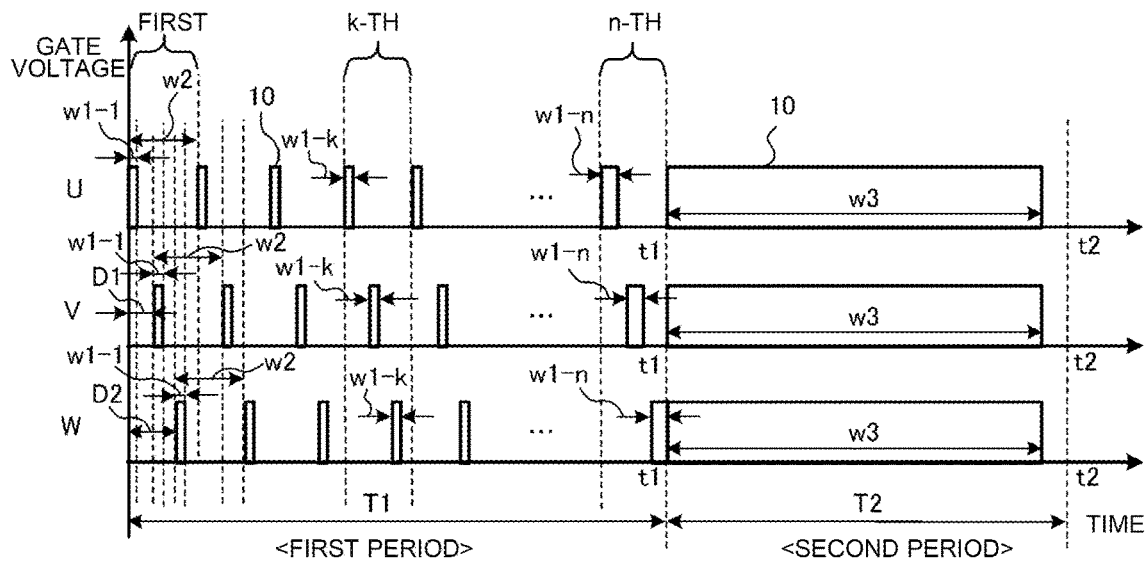
FIG. 4 is a schematic diagram illustrating gate waveforms for charging the bootstrap capacitor 133 in a power converter 100 according to Embodiment 2.

FIG. 4 is a schematic diagram illustrating gate waveforms for charging the bootstrap capacitor 133 in the power converter 100 according to Embodiment 2. In FIG. 4, the horizontal axis represents time, and the vertical axis represents gate waveforms for the U phase, the V phase, and the W phase in the order from top to bottom.

In Embodiment 1, the pulse width w1 of the pulse signals 10 in the first period is a constant value. By contrast, in Embodiment 2, the pulse width w1 of the pulse signals in the first period is variable. That is, in Embodiment 2, in the first period, switching of the low-side semiconductor switch 121L is performed without fixing the pulse width w1 of the pulse signal 10. Because other configurations and operations are the same as those of Embodiment 1, their descriptions will be omitted.

In Embodiment 2, it is assumed that as illustrated in FIG. 4, the pulse width w1 of a pulse signal 10 output in the first carrier period in the first period is w1–1; the pulse width w1 of a pulse signal 10 output in the last carrier period (which will be hereinafter referred to as an n-th carrier period) in the first period is w1–n. In this case, the pulse width w1 is changed in such a manner to satisfy a relationship expressed by the following formula (6).

$$(w1-n) > (w1-1) \tag{6}$$

That is, the pulse width w1–n is greater than the pulse width w1–1. In Embodiment 2, the pulse width w1 is increased at a predetermined increase rate in each of the carrier periods. As the method of increasing the pulse width w1, the following two methods (1) and (2) are present. However, the method of increasing the pulse width w1 is not limited to the two methods (1) and (2). Another method may be used, or a combination of the methods (1) and (2) may be used.

(1) The pulse width w1 is increased at a constant increase rate (linear change) in units of one carrier period from the first carrier period to the n-th carrier period. That is, the relationship "(w1–n)>(w1–k)>(w1–1)" is satisfied, where w1–k is the pulse width w1 of a pulse signal 10 output at the k-th carrier period in the first period, and k is an arbitrary natural number from 1 to n. Thus, the pulse width w1 of a pulse signal 10 output in a (k+1)-th carrier period is greater than the pulse width w1 of the pulse signal 10 output at the k-th carrier period by a constant value.

(2) The pulse width w1 is w1–1, and is unchanged from the first carrier period to the k-th carrier period. It should be noted that k is an arbitrary natural number from 1 to n. In addition, the pulse width w1 is w1–n, and is unchanged from the (k+1)-th carrier period to the n-th carrier period. The pulse width w1 in the above method (1) is increased in a linear fashion, whereas the pulse width w1 in the method (2) is increased in a stepwise manner. The increase rate may be constant or variable. It should be noted that although in this example, the pulse width w1 is changed in two steps, the pulse width w1 may be changed in three or more steps.

Also, in Embodiment 2, the time length T1 of the first period is expressed by the above formula (4) as in Embodiment 1. However, in Embodiment 2, an average value of the duties in the first period is assigned to the duty Duty of the formula (4). That is, for the carrier periods from the first carrier period to the n-th carrier period, Duty=w1/w2 is calculated using the above formula (1), and an average value of these Duties is then calculated.

Although the pulse width for one phase is described above, it is assumed that in the case where a plurality of phases are present, the pulse widths for the phases in the same carrier period are equal to each other.

In the second period from the time t1 to the time t2 at which the bootstrap operation ends, switching for the phases is performed at the same timing and with the pulse width w3. The pulse width w3 falls within the range that satisfies the following formula (7), where w2 is the pulse interval in the first period, and T2 is the time length of the second period.

$$w2 < w3 \leq T2 \tag{7}$$

Also, in Embodiment 2, the pulse width w3 may be made to coincide with the time length T2 of the second period as in Embodiment 1. In this case, w3=T2, and this is also covered by the above formula (7). When w3=T2, the pulse signal 10 is continuously in the on-state in the second period. At the time t2 at which the second period ends, the charging of the bootstrap capacitor 133 is completed.

As described above, because the configuration of Embodiment 2 is basically the same as that of Embodiment 1, in Embodiment 2, it is also possible to obtain the same advantages as in Embodiment 1. In addition, in Embodiment 2, the pulse width w1 of the pulse signal 10 in the first period is variable, and is gradually increased in a linear fashion or a stepwise manner. As described above, the voltage of the control power supply 135 is lowered by charging current in an initial charging period in which the voltage of the bootstrap capacitor 133 is not raised. Therefore, in Embodiment 2, the pulse width w1 of the pulse signal 10 is gradually increased as the voltage of the bootstrap capacitor 133 increases. The greater the pulse width w1, the further greatly the charging of the bootstrap capacitor 133 is accelerated and the shorter the charging time. By contrast, when the pulse width w1 of the pulse signal 10 is excessively increased, a voltage drop of the control power supply 135 is not sufficiently reduced. Therefore, in order to prevent occurrence of a voltage drop of the control power supply 135, in Embodiment 2, a method in which the pulse width w1 of the pulse signal 10 is gradually increased as the voltage of the bootstrap capacitor 133 increases is adopted. As a result, it is possible to shorten the charging time of the control power supply 135 while reducing a voltage drop of the control power supply 135.

Embodiment 3

Figure 5:
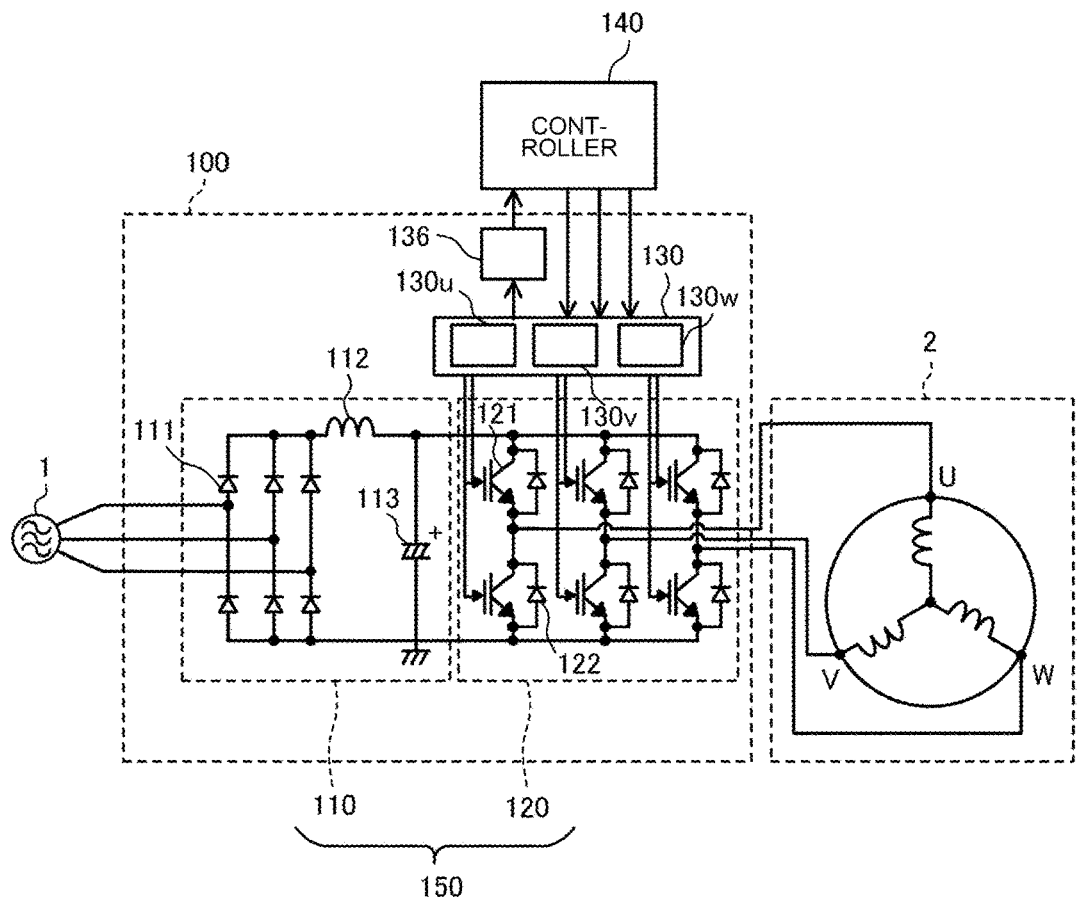
FIG. 5 is a configuration diagram illustrating an example of the configuration of a power converter 100 according to Embodiment 3.
Figure 6:
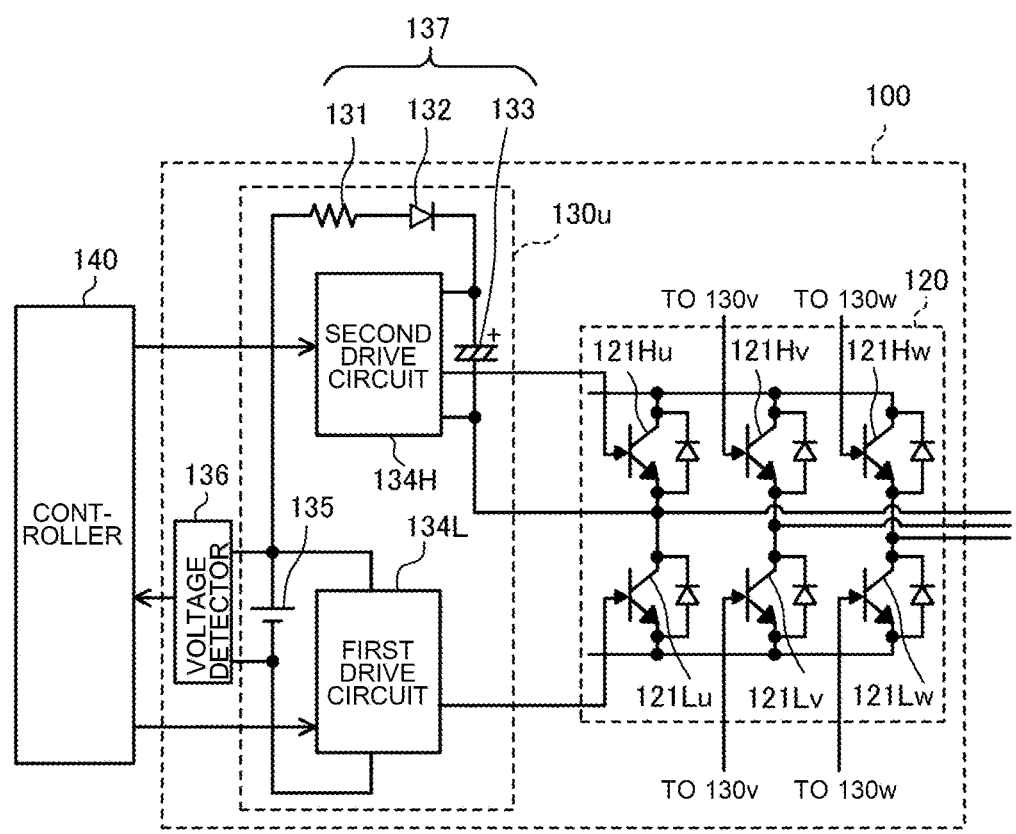
FIG. 6 is an enlarged view illustrating part of the configuration of the gate drive circuit 130 and the configuration of the inverter 120 as illustrated in FIG. 5.

FIG. 5 is a configuration diagram illustrating an example of the configuration of the power converter 100 according to Embodiment 3. FIG. 6 is an enlarged view illustrating part of the configuration of the gate drive circuit 130 and the configuration of the inverter 120 as illustrated in FIG. 5. In Embodiment 3, a voltage detector 136 is added to the configuration of the power converter 100 of Embodiment 1. The voltage detector 136 detects a voltage of the control power supply 135. In the charging period of the bootstrap capacitor 133, the controller 140 determines timing at which the semiconductor switch 121 is turned on/off, based on the voltage of the control power supply 135 which is detected by the voltage detector 136. The other configurations are the same as those of Embodiment 1 and will be briefly described below, and descriptions concerning details of the other configurations will be omitted, since the details of the other configurations are described above.

As illustrated in FIG. 5, the power converter 100 is provided with the gate drive circuit 130 and the power converting module 150 which includes the converter 110 and the inverter 120, as in Embodiment 1. The gate drive circuit 130 applies a voltage to the gate of each of the semiconductor switches 121 provided in the inverter 120 to drive the semiconductor switch 121. In addition, in the case where the case where the converter 110 is an active converter using an active element, the gate drive circuit 130 may drive the converter 110.

Furthermore, the converter 110, the inverter 120, and the gate drive circuit 130 may be provided in the same module, or may be provided separately in two or more modules. In the case where the converter 110, the inverter 120, and the gate drive circuit 130 are provided separately in two or more modules, the way of separating and combining these components is not limited to that of Embodiment 3.

The gate drive circuit 130 drives one or both of the converter 110 and the inverter 120 in response to a control signal from the controller 140.

As illustrated in FIG. 6, the power supply module 137 of the gate drive circuit 130u includes the limiting resistor 131, the bootstrap diode 132, and the bootstrap capacitor 133. Although FIG. 6 illustrates only one phase (U phase), in the case where a plurality of phases are present, power supply modules 137 may be provided for the respective phase or a single power supply module 137 may be provided in common for the phases. In addition, another, such as a filter circuit or a protection circuit, may be incorporated in the gate drive circuit and the power supply module 137.

In addition, in Embodiment 3, as described above, the voltage detector 136 which detects the voltage of the control power supply 135 of the gate drive circuit 130 is provided. The voltage detector 136 transmits a voltage detection signal to the controller 140.

When the bootstrap operation is started, the controller 140 causes the gate drive circuit 130 to output a pulse signal 10 to turn on the low-side semiconductor switch 121L, as in Embodiments 1 and 2. During the bootstrap operation, the controller 140 calculates a voltage variation width $\Delta Vreal$, which is an actual voltage variation width, based on a voltage detection signal from the voltage detector 136. The voltage variation width $\Delta Vreal$ is the difference between the current voltage of the control power supply 135 and a voltage of the control power supply 135 prior to starting of the bootstrap operation.

Furthermore, the controller 140 stores a preset allowable voltage variation width $\Delta V$ (first threshold) in a memory. The controller 140 compares the voltage variation width $\Delta Vreal$ with the allowable voltage variation width $\Delta V$.

As the result of the above comparison, when $\Delta Vreal > \Delta V$, the controller 140 determines that a voltage drop of the control power supply 135 occurs, and turns off a semiconductor switch 121 which is currently in the on-state. More specifically, the controller 140 causes a pulse signal 10 output from the gate drive circuit 130 to be in the off-state. When the semiconductor switch 121 is turned off, the voltage of the control power supply 135 is recovered. Thus, when $\Delta Vreal \leq \Delta V$ is satisfied, the controller 140 causes a pulse signal to be output, to thereby re-turn on the semiconductor switch 121 and restart the bootstrap operation. The controller 140 repeats this processing to charge the bootstrap capacitor 133.

In addition, although it is described above that $\Delta Vreal$ is the difference between the voltage of the control power supply 135 which is detected before the bootstrap operation is started and the current voltage of the control power supply 135, $\Delta Vreal$ is not limited to the above voltage difference. That is, as long as a similar operation to such an operation as described above can be achieved, another method may be used. For example, the voltage variation width $\Delta Vreal$ may be the difference between before and after one of the semiconductor switches 121, such as the U-phase semiconductor switch 121Lu, is turned on. In such a case, the voltage detector 136 is provided for the low-side semiconductor switch 121L.

Furthermore, in the case where the minimum value of the pulse width w1 is set, the following control may be performed. That is, when the time from time at which one of the semiconductor switches 121 is turned on to time at which $\Delta Vreal > \Delta V$ is satisfied is less than the minimum value of the pulse width w1, the semiconductor switch 121 does not need to be immediately turned off. The semiconductor switch 121 may be kept in the on-state until time for which the semiconductor switch 121 is in the on-state exceeds the minimum value of the pulse width w1, and thereafter the semiconductor switch 121 may be turned off.

Moreover, in the charging period of the bootstrap capacitor 133, the controller 140 may determine whether the charging is completed based a power supply voltage detected by the voltage detector 136. In this case, the controller 140 determines the voltage variation width $\Delta Vreal$ between before and after one of the low-side semiconductor switches 121 is turned on, by performing the same processing as described above. When the voltage variation width $\Delta Vreal$ is zero or less than or equal to a preset second threshold value while the low-side semiconductor switch 121 is in the on-state, the controller 140 determines that the charging of the bootstrap capacitor 133 is completed. In this case, the controller 140 keeps the semiconductor switch 121 in the on-state until the time t2, which is the time at which the bootstrap operation is ended.

It should be noted that regarding Embodiment 3, although the operation for one phase is described above, in the case where a plurality of phases are present, switching is performed by the semiconductor switches 121 with a phase difference obtained by dividing 360 degrees by the number p of phases.

As described above, in Embodiment 3, the voltage detector 136 is provided to detect the power supply voltage of the control power supply 135 in the gate drive circuit 130. During the charging period of the bootstrap capacitor 133, the controller 140 determines timing at which the semiconductor switch 121 is turned on/off, based on the voltage of the control power supply 135 that is detected by the voltage detector 136. Thus, in Embodiment 3, the first and second periods described regarding Embodiments 1 and 2 need not be provided. Alternatively, in at least one of the first period and the second period, the controller 140 may determine timing at which the semiconductor switch 121 is turned on/off, based on the voltage of the control power supply 135 which is detected by the voltage detector 136. As described above, because in Embodiment 3, the voltage detector 136 is provided and a pulse signal 10 is output depending on a voltage drop of the control power supply 135, the duty Duty can be varied.

In addition, in Embodiment 3, in the charging period of the bootstrap capacitor 133, the controller 140 calculates the voltage variation width ΔVreal between before and after the low-side semiconductor switches 121 is turned on, based on the variation of the voltage of the control power supply 135 that is detected by the voltage detector 136. When the voltage variation width ΔVreal exceeds the first threshold, the low-side semiconductor switch 121 is turned off. As a result, the state of the control power supply 135 is gradually recovered. When the voltage variation width ΔVreal falls to or below the first threshold, the controller 140 determines that the control power supply 135 recovers to a state in which the control power supply 135 can perform charging, and re-turns on the low-side semiconductor switch 121. Therefore, because the charging of the bootstrap capacitor 133 is performed only when a voltage drop of the control power supply 135 falls within an allowable range, it is possible to prevent a stress from being applied to the power supply module 137 by the voltage drop of the control power supply 135.

Furthermore, in Embodiment 3, in the charging period of the bootstrap capacitor 133, the controller 140 determines the voltage variation width ΔVreal between before and after the low-side semiconductor switches 121 is turned on, based on the variation of the voltage of the control power supply 135 which is detected by the voltage detector 136. When the voltage variation width ΔVreal is zero or less than or equal to the second threshold value while the low-side semiconductor switch 121 is in the on-state, the controller 140 determines that the charging of the bootstrap capacitor 133 is completed. In this case, the controller 140 keeps the semiconductor switch 121 in the on-state until the time t2. As a result, the charging of the bootstrap capacitor 133 can be reliably performed, and it is possible to prevent a stress from being applied to the power supply module 137 due to a voltage drop of the control power supply 135.

Then, the hardware configuration of the controller 140 in the power converter 100 according to each of Embodiments 1 to 3 will be described. The controller 140 may achieve the above operations with software using a microcomputer or a similar device, or with hardware using an analog circuit or a similar device. Alternatively, the operations may be achieved by a combination of software and hardware.

The hardware configuration of the controller 140 will be described in detail. The controller 140 includes a processing circuit. The processing circuit includes dedicated hardware or a processor. The dedicated hardware is, for example, an application specific integrated circuit (ASIC) or a field programmable gate array (FPGA). The processor executes a program stored in a memory. The controller 140 includes the memory. The memory is a non-volatile or volatile semiconductor memory, such as a random access memory (RAM), a read only memory (ROM), a flash memory, or an erasable programmable ROM (EPROM), or a disk, such as a magnetic disk, a flexible disk, or an optical disk.

In addition, regarding Embodiments 1 to 3, although it is described above by way of example that the power supply to which the power converter 100 is connected is the AC power supply 1, the power supply is not limited thereto. That is, the power supply to which the power converter 100 is connected may be a DC power supply. In this case, in the configurations as illustrated in FIGS. 1 and 5, the converter 110 need not to be provided. Furthermore, although FIGS. 1 and 5 each illustrate the case where the AC power supply 1 uses a three-phase three-wire AC, the AC of the AC power supply 1 may be a single-phase AC, or may be a three-phase four-wire AC.

Moreover, in the power converter 100 according to each of Embodiments 1 to 3, each of elements used in the converter 110 and the inverter 120 may be made of a wide-bandgap semiconductor having a larger band gap than silicon (Si). More specifically, the switching elements such as the semiconductor switches 121 and the switching elements 115 and 116, the diodes such as the rectifier diode 114 and the freewheeling diode 122, and the other elements may each be made of a wide-bandgap semiconductor. As wide-bandgap semiconductors, silicon carbide (SiC), gallium nitride (GaN), gallium oxide ($Ga_2O_3$), and diamond are present.

Switching elements, diodes, and other elements which are made of such wide-bandgap semiconductors have a high withstand voltage and a high allowable current density. Thus, the switching elements, the diodes, and the other elements can be made smaller. In addition, by using the above elements made smaller, a semiconductor module into which these elements are incorporated can also be made smaller.

Furthermore, because the wide-bandgap semiconductors have a high heat resistance, radiating fins of a heatsink can be made smaller, and a water-cooling section can be cooled by air. Thus, the semiconductor module can be made far smaller.

Moreover, because the wide-bandgap semiconductors have a low power loss, the efficiency of the switching elements, diodes, and other elements can be improved, and as a result, the efficiency of the semiconductor module can be improved.

It should be noted that it is preferable that all of the switching elements, the diodes, and the other elements be each made of a wide-bandgap semiconductor. However, it is not indispensable that all the above elements are made of a wide-bandgap semiconductor. The switching elements, or the diodes, or the other elements may be made of a wide-bandgap semiconductor. Even in such a case, the above advantages can be obtained.

Embodiment 4

Embodiment 4 will be described on the assumption that the power converter 100 according to Embodiment 1 is applied to an air-conditioning apparatus 400.

Figure 7:
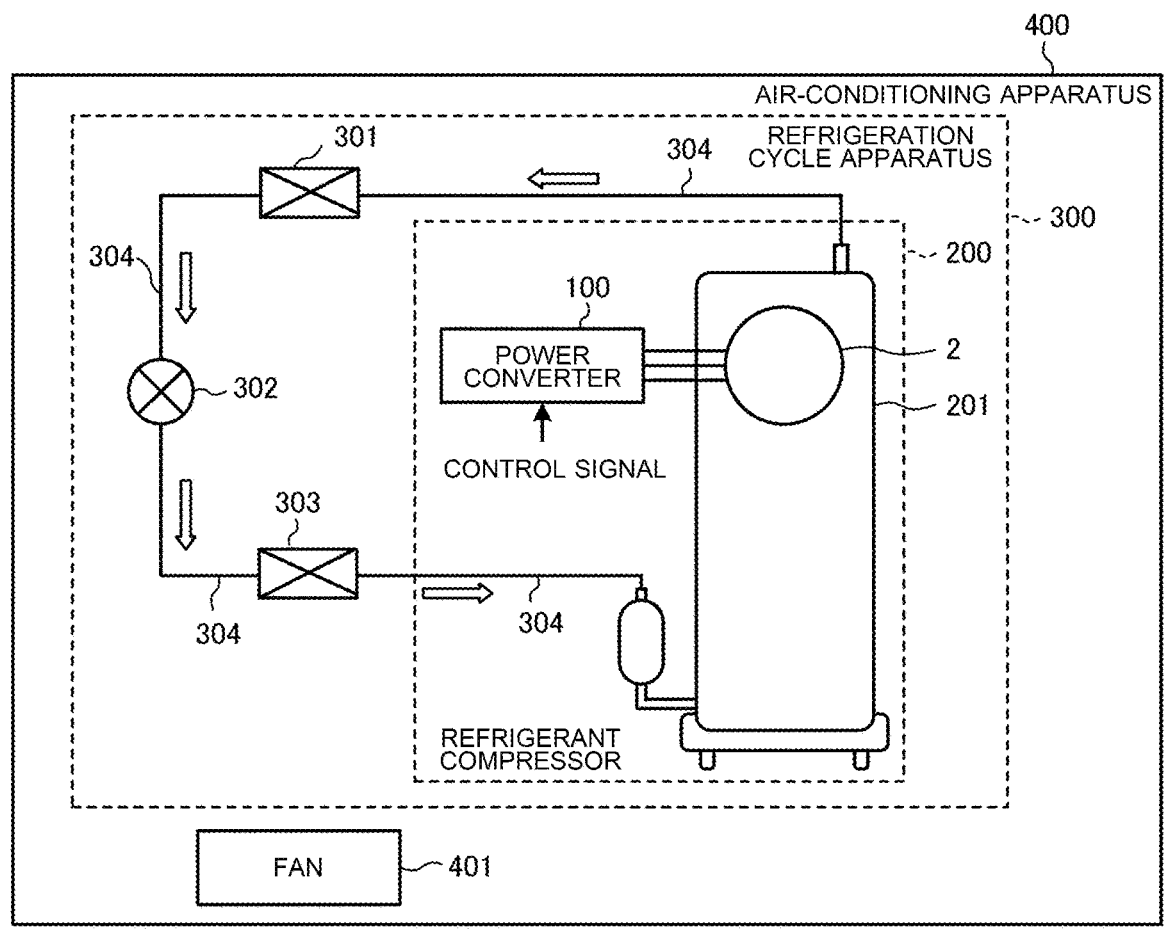
FIG. 7 is a configuration diagram illustrating an example of the configuration of an air-conditioning apparatus 400 according to Embodiment 4.

FIG. 7 is a configuration diagram illustrating an example of the configuration of the air-conditioning apparatus 400 according to Embodiment 4. As illustrated in FIG. 7, the air-conditioning apparatus 400 includes a refrigeration cycle apparatus 300 and a fan 401. The refrigeration cycle apparatus 300 includes a refrigerant compression apparatus 200, a condenser 301, an expansion valve 302, and an evaporator 303. The refrigerant compression apparatus 200 includes a compressor 201 and the power converter 100.

As illustrated in FIG. 7, the compressor 201 and the condenser 301 are connected by a refrigerant pipe 304. Similarly, the condenser 301 and the expansion valve 302 are connected by a refrigerant pipe 304; the expansion valve 302 and the evaporator 303 are also connected by a refrigerant pipe 304; and the evaporator 303 and the compressor 201 are also connected by a refrigerant pipe 304. As a result, the compressor 201, the condenser 301, the expansion valve 302, and the evaporator 303 form a refrigerant circuit through which refrigerant circulates.

The compressor 201 sucks refrigerant from a suction port. The compressor 201 then compresses the sucked refrigerant into high-temperature and high-pressure gas refrigerant and discharges the high-temperature and high-pressure gas refrigerant from a discharge port. The compressor 201 includes the electric motor 2, which is subjected to variable speed control by the power converter 100. The compressor 201 is, for example, an inverter compressor. The operation frequency of the compressor 201 can be arbitrarily changed by the inverter 120 of the power converter 100. Thus, the amount of refrigerant that the compressor 201 can deliver per unit time can be changed. The refrigerant discharged from the compressor 201 flows into the condenser 301.

The condenser 301 causes heat exchange to be performed between the refrigerant flowing therein and air. The condenser 301 condenses the high-temperature and high-pressure gas refrigerant that flows from the compressor 201 to change it into high-pressure liquid refrigerant (single phase). The condenser 301 is, for example, a fin-and-tube type heat exchanger.

The expansion valve 302 is a pressure reducing device that reduces the pressure of the liquid refrigerant that flows from the condenser 301 to expand the refrigerant. The expansion valve 302 is, for example, an electronic expansion valve. In the case where the expansion valve 302 is an electronic expansion valve, the opening degree of the expansion valve 302 is controlled based on an instruction given by a controller not illustrated or a similar device. The expansion valve 302 is provided between the condenser 301 and the evaporator 303. The expansion valve 302 reduces the pressure of the liquid refrigerant that flows from the condenser 301 to change the liquid refrigerant into low-pressure two-phase gas-liquid refrigerant.

The evaporator 303 causes heat exchange to be performed between the refrigerant flowing therein and air. The evaporator 303 evaporates liquid refrigerant of the two-phase gas-liquid refrigerant which flows from the expansion valve 302 to change the liquid refrigerant into low-pressure gas refrigerant (single phase). The evaporator 303 is, for example, a fin-and-tube type heat exchanger.

In addition, the fan 401 sends air to at least one of the condenser 301 and the evaporator 303.

In the refrigeration cycle apparatus 300, the processes of evaporation, compression, condensation, expansion of the refrigerant are repeatedly performed. The refrigerant changes from liquid refrigerant to gas refrigerant and from gas refrigerant to liquid refrigerant, thereby exchanging heat with outside air. It is therefore possible to form the air-conditioning apparatus 400 by combining the refrigeration cycle apparatus 300 with the fan 401, which circulates outside air.

Although the above description is made with respect to the case where the power converter 100 according to Embodiment 1 is applied to the air-conditioning apparatus 400, the power converter to be applied to the air-conditioning apparatus 400 is not limited to the power converter 100 according to Embodiment 1. The power converter 100 according to Embodiment 2 or 3 may be applied to the air-conditioning apparatus 400.

INDUSTRIAL APPLICABILITY

In the above descriptions regarding Embodiments 1 to 4, the air-conditioning apparatus 400 is explained as an example of an apparatus to which the power converter 100 is applied. However, needless to say, the power converter 100 can be applied to other types of apparatuses. For example, the power converter 100 can be widely applied to an air-conditioning cooling energy apparatus using an inverter or to an apparatus that drives a load, such as a compressor or an electric motor.

REFERENCE SIGNS LIST

1: AC power supply, 2: electric motor, 10: pulse signal, 100: power converter, 110: converter, 111: rectifier circuit, 112: DC reactor, 113: smoothing capacitor, 114: rectifier diode, 115: switching element, 116: switching element, 120: inverter, 121: semiconductor switch, 121H: semiconductor switch, 121Hu: semiconductor switch, 121Hv: semiconductor switch, 121Hw: semiconductor switch, 121L: semiconductor switch, 121Lu: semiconductor switch, 121Lv: semiconductor switch, 121Lw: semiconductor switch, 122: freewheeling diode, 125: middle point, 125$u$: middle point, 126: output terminal, 130: gate drive circuit, 130$u$: gate drive circuit, 130$v$: gate drive circuit, 130$w$: gate drive circuit, 131: limiting resistor, 132: bootstrap diode, 133: bootstrap capacitor, 134H: second drive circuit, 134L: first drive circuit, 135: control power supply, 136: voltage detector, 137: power supply module, 140: controller, 150: power converting module, 151: positive-side bus, 152: negative-side bus, 200: refrigerant compression apparatus, 201: compressor, 300: refrigeration cycle apparatus, 301: condenser, 302: expansion valve, 303: evaporator, 304: refrigerant pipe, 400: air-conditioning apparatus, 401: fan, A: coefficient, C: capacitance, D1: phase difference, D2: phase difference, Duty: duty, R: resistance value, T1: time length, T2: time length, p: number of phases, t1: time, t2: time, w1: pulse width (first pulse width), w2: pulse interval, w3: pulse width (second pulse width), ΔV: allowable voltage variation width, ΔVreal: voltage variation width, τ: time constant

The invention claimed is:

1. A power converter comprising:
a power converting module in which at least two switching elements are connected in series to form a series body, one end of the series body is connected to a power supply potential side and the other end of the series body is connected to a reference potential side, and a middle point of the series body is connected to an output terminal; and
a gate drive circuit configured to output a pulse signal based on a control signal from a controller to drive the switching elements, the controller being provided outside the power converter,
wherein the gate drive circuit includes a first drive circuit configured to drive one of the switching elements that is connected to the reference potential side, when being supplied with power from the control power supply, a second drive circuit configured to drive one of the switching elements that is connected to the power supply potential side, and a power supply module including a limiting resistor, a bootstrap diode, and a bootstrap capacitor, which are connected in series between the control power supply and the output terminal, the power supply module being configured to generate a power supply voltage to be supplied to the second drive circuit, wherein the bootstrap capacitor is charged when the switching element connected to the reference potential side performs switching, a charging period of the bootstrap capacitor includes at least a first period and a second period, in the first period, the switching element connected to the reference potential side is driven by a pulse signal having a first pulse width, in the second period, the switching element connected to the reference potential side is driven by a pulse signal having a second pulse width which is greater than the first pulse width, and the first pulse width in the first period is determined based on an allowable magnitude of a voltage drop of the control power supply in the first period.

2. The power converter of claim 1, wherein the power converting module has a plurality of phases, and for the phases, includes respective series bodies identical to the series body, and where the number of the phases of the power converting module is p, in the first period, of the switching elements provided for the phases, switching elements connected to the reference potential side perform switching with a phase difference obtained by dividing 360 degrees by the number p of phases.

3. The power converter of claim 1, wherein a time length T1 of the first period satisfies the following relationship:

$T1 > A \times C \times R / \text{Duty}$ where in the first period, Duty is a value obtained by dividing by a carrier period, time for which the switching element connected to the reference potential side is in an on-state, C is a capacitance of the bootstrap capacitor, R is a resistance value of the limiting resistor, and A is a coefficient that is greater than or equal to 1.

4. The power converter of claim 3, wherein the coefficient A is greater than or equal to 2 and is determined based on an allowable magnitude of a voltage drop of the control power supply in the second period.

5. The power converter of claim 1, wherein the second pulse width of the second period is greater than the carrier period of the pulse signal in the first period.

6. The power converter of claim 1, wherein the first pulse width of the pulse signal in the first period is variable, and when the first period is divided into n carrier periods each equal to the carrier period, the first pulse width of the pulse signal in an n-th carrier period in the first period is greater than the first pulse width of the pulse signal in a first carrier period in the first period.

7. The power converter of claim 6, wherein where Duty is a value obtained by dividing by the carrier period, time for which the switching element connected to the reference potential side is in an on-state, the duty Duty in the first period is calculated using an average value of the first pulse widths of the pulse signals from the first carrier period to the n-th carrier period.

8. The power converter of claim 1, further comprising:

a voltage detector configured to detect a power supply voltage of the control power supply in the gate drive circuit, wherein the controller is configured to determine, in a charging period of the bootstrap capacitor, timing at which the switching element connected to the reference potential side is turned on/off, based on the power supply voltage detected by the voltage detector.

9. The power converter of claim 8, wherein in the charging period of the bootstrap capacitor, the controller calculates a voltage variation width between before and after the switching element connected to the reference potential side is turned, on based on a variation of the power supply voltage detected by the voltage detector, the controller turns off the switching element connected to the reference potential side when the voltage variation width exceeds a first threshold, and turns on the switching element connected to the reference potential side when the voltage variation width falls to or below the first threshold.

10. The power converter of claim 8, wherein in the charging period of the bootstrap capacitor, the controller calculates a voltage variation width between before and after the switching element connected to the reference potential side is turned on, based on a variation of the power supply voltage detected by the voltage detector, and the controller keeps the switching element connected to the reference potential side in an on-state, when the voltage variation width is zero or less than or equal to a second threshold while the switching element is in the on-state.

11. The power converter of claim 1, wherein the switching element is made of a wide-bandgap semiconductor that is silicon carbide, gallium nitride, gallium oxide, or diamond.

12. An air-conditioning apparatus comprising:

a refrigeration cycle apparatus including the power converter of claim 1, a compressor configured to be driven by an electric motor, which is a load of the power converter, a condenser configured to condense refrigerant discharged from the compressor, an expansion valve configured to decompress the condensed refrigerant, and an evaporator configured to evaporate the decompressed refrigerant; and a fan configured to send air to at least one of the condenser and the evaporator of the refrigeration cycle apparatus.

* * * * *